(12) United States Patent
Suzuki et al.

(10) Patent No.: US 11,276,872 B2
(45) Date of Patent: Mar. 15, 2022

(54) FUEL CELL STACK

(71) Applicant: HONDA MOTOR CO., LTD., Tokyo (JP)

(72) Inventors: Masaharu Suzuki, Utsunomiya (JP);
Yusuke Nara, Utsunomiya (JP);
Tadashi Nishiyama, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 16/357,701

(22) Filed: Mar. 19, 2019

(65) Prior Publication Data

US 2019/0214669 A1 Jul. 11, 2019

Related U.S. Application Data

(62) Division of application No. 14/668,052, filed on Mar. 25, 2015, now Pat. No. 10,283,803.

(51) Int. Cl.
| | |
|---|---|
| *H01M 8/2475* | (2016.01) |
| *H01M 8/0258* | (2016.01) |
| *H01M 8/2483* | (2016.01) |
| *H01M 8/0271* | (2016.01) |
| *H01M 8/241* | (2016.01) |
| *H01M 8/2457* | (2016.01) |
| *H01M 8/04029* | (2016.01) |
| *H01M 8/10* | (2016.01) |

(52) U.S. Cl.
CPC ....... *H01M 8/2475* (2013.01); *H01M 8/0258* (2013.01); *H01M 8/0271* (2013.01); *H01M 8/04029* (2013.01); *H01M 8/241* (2013.01); *H01M 8/2457* (2016.02); *H01M 8/2483* (2016.02); *H01M 2008/1095* (2013.01)

(58) Field of Classification Search
CPC ............. H01M 8/2475; H01M 8/2457; H01M 8/2483; H01M 8/0258; H01M 8/0271; H01M 8/04029; H01M 8/241
See application file for complete search history.

(56) References Cited

U.S. PATENT DOCUMENTS 8,802,311 B2    8/2014 Iritsuki et al.

FOREIGN PATENT DOCUMENTS

| AU | WO1996020509 A1 | * | 7/1996 | ............. H01M 8/24 |
| JP | 60-105177 | * | 6/1985 | ............. H01M 8/04 |

(Continued)

OTHER PUBLICATIONS

Office Action dated Jan. 10, 2017, issued over corresponding Japanese Patent Application No. 2014-069568 with the English translation of pertinent portion.

(Continued)

*Primary Examiner* — Helen Oi K Conley
(74) *Attorney, Agent, or Firm* — Carrier Blackman & Associates, P.C.; Joseph P. Carrier; Jeffrey T. Gedeon

(57) ABSTRACT

A fuel cell stack includes a stack body formed by stacking a plurality of fuel cells together in a stacking direction. A second end plate is provided at one end of the stack body in the stacking direction. A pair of coolant supply passages are provided at upper and lower positions of the second end plate for allowing a coolant to flow into the fuel cells. A coolant supply manifold member is attached to the second end plate, and an insulating plate is provided between the second end plate and the coolant supply manifold member.

2 Claims, 12 Drawing Sheets

(56) References Cited

FOREIGN PATENT DOCUMENTS

| | | |
|---|---|---|
| JP | 62-170172 A | 7/1987 |
| JP | 62-243261 A | 10/1987 |
| JP | H02-024972 A | 1/1990 |
| JP | 09-063623 A | 3/1997 |
| JP | 10-012262 A | 1/1998 |
| JP | 2007-188664 A | 7/2007 |
| JP | 4165876 B2 | 10/2008 |
| JP | 2011-014518 A | 1/2011 |
| JP | 2011-060449 A | 3/2011 |
| JP | 5054080 B2 | 10/2012 |

OTHER PUBLICATIONS

Office Action dated Dec. 20, 2016, issued over the corresponding Japanese Patent Application No. 2014-175623 with English translation of pertinent portion.

Office Action dated Jun. 12, 2018, issued over the corresponding Japanese Patent Application 2014-069568 with the English translation of pertinent portion.

* cited by examiner

FUEL CELL STACK

CROSS-REFERENCE TO RELATED APPLICATIONS

This application is a divisional of U.S. Ser. No. 14/668,052, filed Mar. 25, 2015, which is based upon and claims the benefit of priority from Japanese Patent Applications No. 2014-069568 filed on Mar. 28, 2014, No. 2014-082929 filed on Apr. 14, 2014, and No. 2014-175623 filed on Aug. 29, 2014. The entire contents of all of these parent and priority applications are incorporated herein by reference.

BACKGROUND OF THE INVENTION

Field of the Invention

The present invention relates to a fuel cell stack including a plurality of fuel cells for generating electrical energy by electrochemical reactions of a fuel gas and an oxygen-containing gas. The fuel cells are stacked together in a stacking direction, and end plates are provided at both ends of the fuel cell stack in the stacking direction.

Description of the Related Art

For example, a solid polymer electrolyte fuel cell employs a polymer ion exchange membrane as an electrolyte membrane, and the polymer electrolyte membrane is interposed between an anode and a cathode to form a membrane electrode assembly (MEA). The membrane electrode assembly and a pair of separators sandwiching the membrane electrode assembly make up a power generation cell for generating electricity. In use, typically, a predetermined number of the power generation cells are stacked together to form a fuel cell stack, e.g., mounted in a fuel cell vehicle (fuel cell electric automobile, etc.).

In the fuel cell, a fuel gas flow field for supplying a fuel gas to the anode and an oxygen-containing gas flow field for supplying an oxygen-containing gas to the cathode are provided in the surfaces of the separators. Further, a coolant flow field for supplying a coolant is provided between the adjacent separators along surfaces of the adjacent separators.

In the fuel cell, internal manifold structure has been adopted. In the internal manifold structure, fuel gas passages for allowing the fuel gas to flow through the fuel cell, oxygen-containing gas passages for allowing the oxygen-containing gas to flow therethrough, and coolant passages for allowing the coolant to flow therethrough extend through the fuel cells in the stacking direction. The fuel gas passages are a fuel gas supply passage and a fuel gas discharge passage. The oxygen-containing gas passages are an oxygen-containing gas supply passage and an oxygen-containing gas discharge passage. The coolant passages are a coolant supply passage and a coolant discharge passage.

In the fuel cell, at least one of the end plates is equipped with a fluid manifold connected to each passage for supplying or discharging fluid (fuel gas, oxygen-containing gas, or coolant). Further, a fluid supply pipe and a fluid discharge pipe are connected to the fluid manifold.

In this regard, a reactant gas as one of the oxygen-containing gas and the fuel gas is humidified beforehand, and the humidified reactant gas is then supplied to the fuel cell. Further, in the fuel cell, water tends to be produced at the cathode by electrochemical reaction, and back diffusion of the produced water toward the anode tends to occur. Consequently, water vapor may be retained in the fluid manifold, and the water vapor may be condensed to produce liquid water (condensed water). Under the circumstances, the fuel cell may be undesirably connected electrically to external equipment, etc. due to connection through the liquid water (i.e., liquid junction may occur).

As a fuel cell aimed to prevent production of water droplets in the reactant gas, for example, a solid polymer electrolyte fuel cell disclosed in Japanese Laid-Open Patent Publication No. 10-012262 is known. The fuel cell has a pressing plate for pressing a stack body of the fuel cell in a stacking direction. The pressing plate has a heating section at a position where a pipe connector is provided, for heating at least one of the oxygen-containing gas and the fuel gas.

The heating section has a cylindrical outer shape having substantially the same thickness as a body portion of the pressing plate. A cylindrical hollow area is provided in the heating section. The heating section has a gas conduction section for sealing the hollow area in an air-tight manner from the inside. At the center of the gas conduction section, a through hole as a passage of the oxygen-containing gas is formed. Further, according to the disclosure, since a heating medium heated by cooling the stack body is supplied to the hollow area, the oxygen-containing gas flowing through the gas conduction section is heated by the heating medium, and it is possible to suppress production of liquid water.

Moreover, in the fuel cell, a pair of coolant supply passages and a pair of coolant discharge passages may be arranged separately at both sides (in one of two pairs of opposite sides) of the separator. The coolant supply passages and the coolant discharge passages extend through the fuel cell in the stacking direction for allowing the coolant to flow through the fuel cell. In this regard, the fuel cell adopts a structure where the pair of coolant supply passages are connected together by a single coolant manifold, and the pair of coolant discharge passages are connected together by a single coolant manifold.

For example, in a fuel cell stack disclosed in Japanese Patent No. 5054080, electrolyte electrode assemblies and separators are stacked together, and rectangular end plates are provided at both ends of the fuel cell stack in the stacking direction. On two long opposite sides of the fuel cell stack, a pair of coolant supply passages are arranged oppositely at one end side of the long sides, and a pair of coolant discharge passages are arranged oppositely at the other end side thereof.

Further, a pair of manifold sections are provided at one of the end plates. The manifold sections are connected to at least the pair of coolant supply passages or the pair of coolant discharge passages. Moreover, a coupling section is provided for coupling the pair of manifold sections together. The width of the coupling section along the long side is smaller than the dimension of the pair of manifold sections.

As described above, since the pair of manifold sections are coupled by the coupling section having a narrow width, the manifold does not have a rectangular shape as a whole. According to the disclosure, increase in the pressure loss of the coolant flowing into the manifold is suppressed effectively, and the coolant can be supplied smoothly and uniformly to the fuel cell.

SUMMARY OF THE INVENTION

However, in Japanese Laid-Open Patent Publication No. 10-012262, the heating section and the gas conduction section are provided for heating the reactant gas such as the oxygen-containing gas. Therefore, the structure is complicated, and uneconomical.

Further, in the fuel cell, in addition to the manifolds for the reactant gases, the coolant manifold as a passage of the coolant is provided. The coolant manifold tends to be electrically connected to the inside of the fuel cell through the coolant, and liquid junction between the fuel cell and external equipment may occur through the coolant. However, in the above fuel cell, it is not possible to suppress liquid junction between the fuel cell and the external equipment.

The present invention has been made to solve the problems of this type, and an object of the present invention is to provide a fuel cell stack having simple and economical structure in which it is possible to suitably achieve a desired electrical insulating performance between fluid manifolds and end plates.

Further, an object of the present invention is to provide a fuel cell stack having simple and economical structure in which a coolant can flow smoothly and uniformly inside a coolant manifold.

A fuel cell stack according to an aspect of the present invention includes a stack body formed by stacking a plurality of fuel cells together in a stacking direction for generating electrical energy by electrochemical reactions of a fuel gas and an oxygen-containing gas. A fluid passage extends through the stack body in the stacking direction for allowing a fluid, which is a coolant, the fuel gas, or the oxygen-containing gas, to flow through the fuel cells.

End plates are provided at both ends of the stack body in the stacking direction. At least one of the end plates has a fluid manifold member connected to the fluid passage. An insulating plate is provided between the one of the end plates and an attachment surface of the fluid manifold member.

Further, a fuel cell stack according to another aspect of the present invention includes a plurality of fuel cells stacked together in a stacking direction and end plates provided at both ends of the fuel cells in the stacking direction. Each of the fuel cells is formed by stacking a membrane electrode assembly and separators. The membrane electrode assembly includes a pair of electrodes and an electrolyte membrane interposed between the electrodes. A coolant flow field is formed between adjacent ones of the separators for allowing a coolant to flow along separator surfaces.

A pair of coolant supply passages are provided at an inlet side of the coolant flow field and arranged respectively on both sides of the coolant flow field in a flow field width direction. A pair of coolant discharge passages are provided at an outlet side of the coolant flow field and arranged respectively on both sides of the coolant flow field in the flow field width direction. A coolant manifold connected to the pair of coolant supply passages or the pair of coolant discharge passages is provided on one of the end plates. A pipe section as a coolant supply port or a passage discharge port is provided at a central portion of the coolant manifold in the flow field width direction. A protrusion bulging toward the pipe section is provided on a manifold inner surface facing the pipe section.

Further, in a fuel cell stack according to another aspect of the present invention, a pipe section as a coolant supply port or a passage discharge port is provided at a central portion of the coolant manifold in the flow field width direction. Protrusions bulging toward an inside of the coolant manifold are provided respectively on both sides of the pipe section.

In the present invention, the insulating plate is provided between the fluid manifold member and the end plate. Therefore, with the simple and economical structure, a desired electrical insulating performance between the fluid manifold member and the end plate is achieved suitably. Accordingly, it is possible to suitably suppress electrical connection between the fuel cell and the external equipment through liquid water.

Further, in the present invention, a pipe section is provided on the coolant manifold, and a protrusion bulging toward the pipe section is provided on a manifold inner surface facing the pipe section. In the structure, for example, the coolant supplied from the single coolant supply port into the coolant manifold is distributed toward each coolant supply passage by the guiding action of the protrusion. Further, by the guiding action of the protrusion, the coolant discharged from each coolant discharge passage to the coolant manifold flows toward the single coolant discharge port.

Thus, with the simple and economical structure, the coolant supplied into the coolant manifold can smoothly and uniformly flow toward the pair of coolant supply passages. Further, the coolant can flow from the pair of coolant discharge passages to the coolant manifold smoothly and uniformly. Accordingly, improvement in the cooling performance in each fuel cell is achieved suitably.

Further, in the present invention, a pipe section is provided on the coolant manifold, and protrusions bulging toward the inside of the coolant manifold are provided respectively on both sides of the pipe section. In the structure, for example, the coolant supplied from the single coolant supply port into the coolant manifold is distributed toward each coolant supply passage by the guiding action of the protrusions. Further, by the guiding action of the protrusions, the coolant discharged from each coolant discharge passage to the coolant manifold flows toward the single coolant discharge port.

Thus, with the simple and economical structure, the coolant supplied into the coolant manifold can smoothly and uniformly flow toward the pair of coolant supply passages. Further, the coolant can flow from the pair of coolant discharge passages to the coolant manifold smoothly and uniformly. Accordingly, improvement in the cooling performance in each fuel cell is achieved suitably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
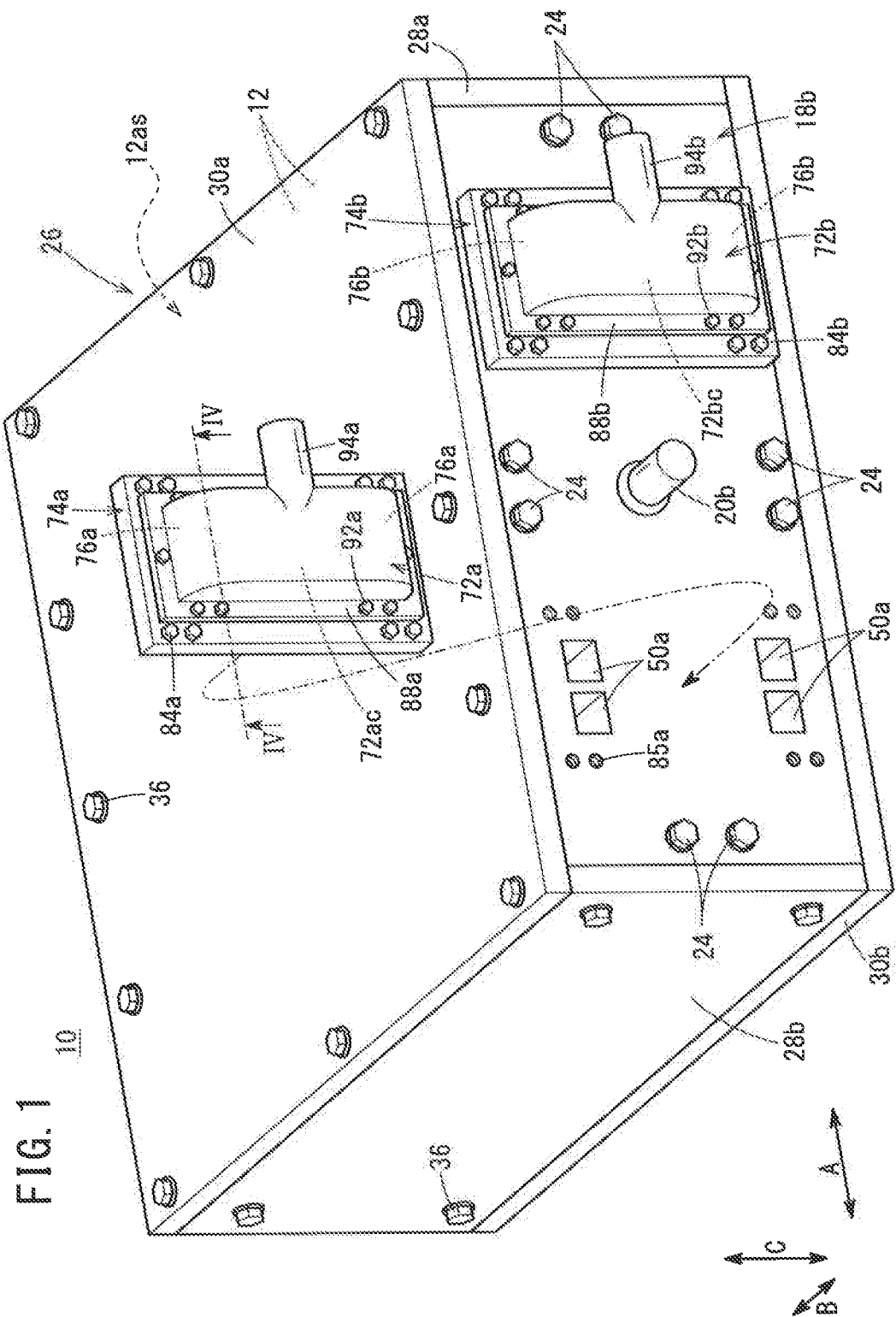
FIG. 1 is a perspective view of a fuel cell stack according to a first embodiment of the present invention, as viewed from a coolant manifold member side.
Figure 2:
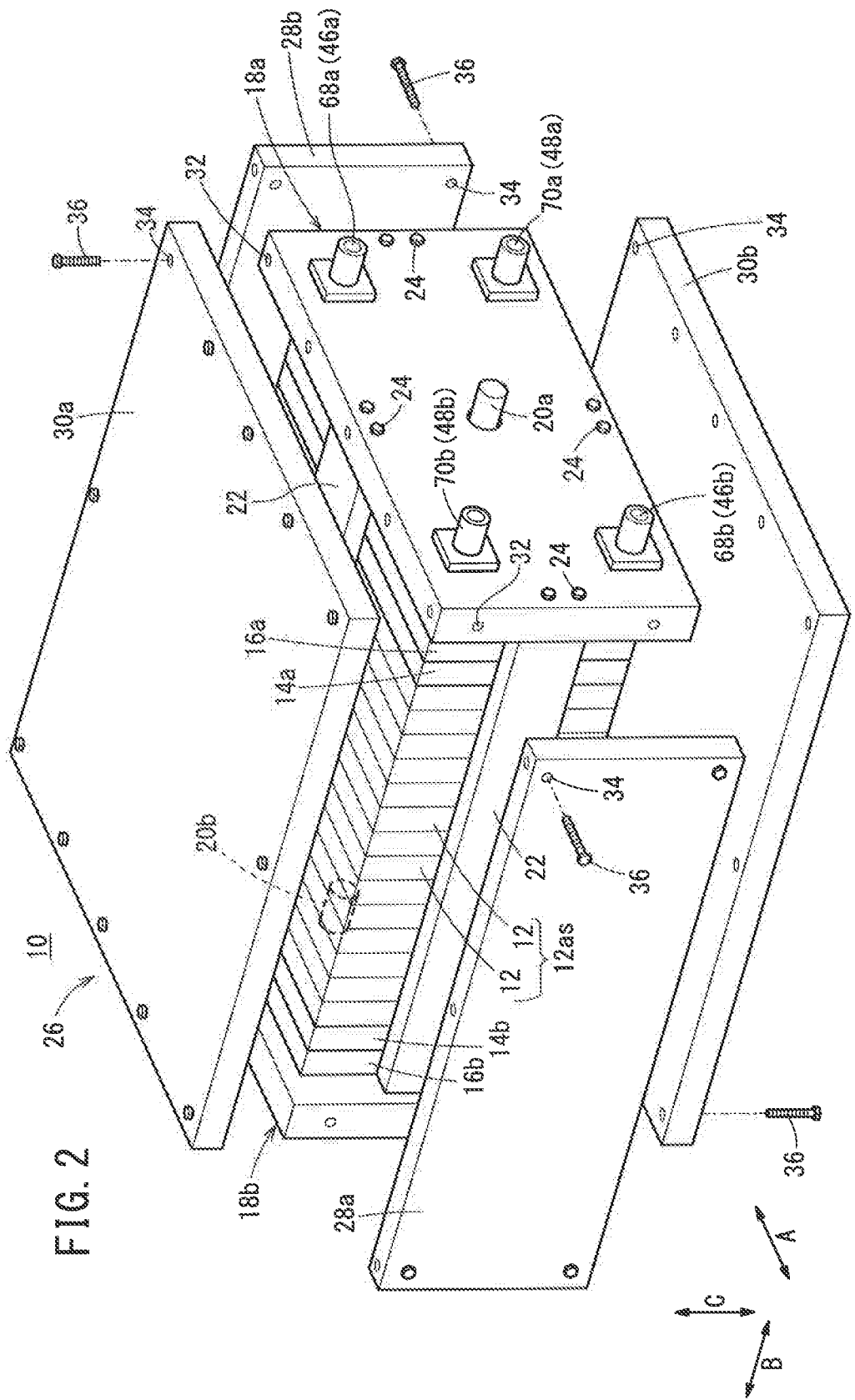
FIG. 2 is a partial exploded perspective view showing the fuel cell stack.

A fuel cell stack 10 according to a first embodiment of the present invention shown in FIGS. 1 and 2 is mounted, e.g., in a fuel cell electric vehicle (not shown). The fuel cell stack 10 includes a stack body 12as formed by stacking a plurality of fuel cells 12 in a horizontal direction indicated by an arrow B such that electrode surfaces of the fuel cells 12 are oriented upright. It should be noted the fuel cell stack 10 may be formed by stacking a plurality of fuel cells 12 in the direction of gravity.

As shown in FIG. 2, at one end of the fuel cells 12 in a stacking direction (one end of the stack body 12as), a first terminal plate 14a is provided. A first insulating plate 16a is provided outside the first terminal plate 14a, and a first end plate 18a is provided outside the first insulating plate 16a. At the other end of the fuel cells 12 in the stacking direction (the other end of the stack body 12as), a second terminal plate 14b is provided. A second insulating plate 16b is provided outside the second terminal plate 14b, and a second end plate 18b is provided outside the second insulating plate 16b.

A first power output terminal 20a extends outward from a substantially central position of the first end plate 18a having a laterally elongated shape (rectangular shape). The first power output terminal 20a may extend from a position deviated from the central position of the first end plate 18a. The first power output terminal 20a is connected to the first terminal plate 14a. A second power output terminal 20b extends outward from a substantially central position of the second end plate 18b having a laterally elongated shape (rectangular shape). The second power output terminal 20b is connected to the second terminal plate 14b.

Coupling bars 22 each having a constant length are provided between the first end plate 18a and the second end plate 18b at substantially central positions of respective sides of the first end plate 18a and the second end plate 18b. Both ends of each of the coupling bars 22 are fixed respectively to the first end plate 18a and the second end plate 18b using screws 24, whereby a tightening load is applied to the stack body 12as in the direction indicated by the arrow B.

The fuel cell stack 10 includes a casing 26 as necessary. Two sides (surfaces) of the casing 26 at both ends in a vehicle width direction indicated by an arrow B are the first end plate 18a and the second end plate 18b. Two sides (surfaces) of the casing 26 at both ends in a vehicle length direction indicated by an arrow A are a front side panel 28a and a rear side panel 28b. The front side panel 28a and the rear side panel 28b are laterally elongated plates. Two sides (surfaces) of the casing 26 at both ends in a vehicle height direction indicated by an arrow C are an upper side panel 30a and a lower side panel 30b. The upper side panel 30a and the lower side panel 30b are laterally elongated plates.

Each side of the first end plate 18a and the second end plate 18b has screw holes 32. The front side panel 28a, the rear side panel 28b, the upper side panel 30a, and the lower side panel 30b have holes 34 at positions facing the respective screw holes 32. Screws 36 inserted through the holes 34 are screwed into the screw holes 32 to fix the components of the casing 26 together.

Figure 3:
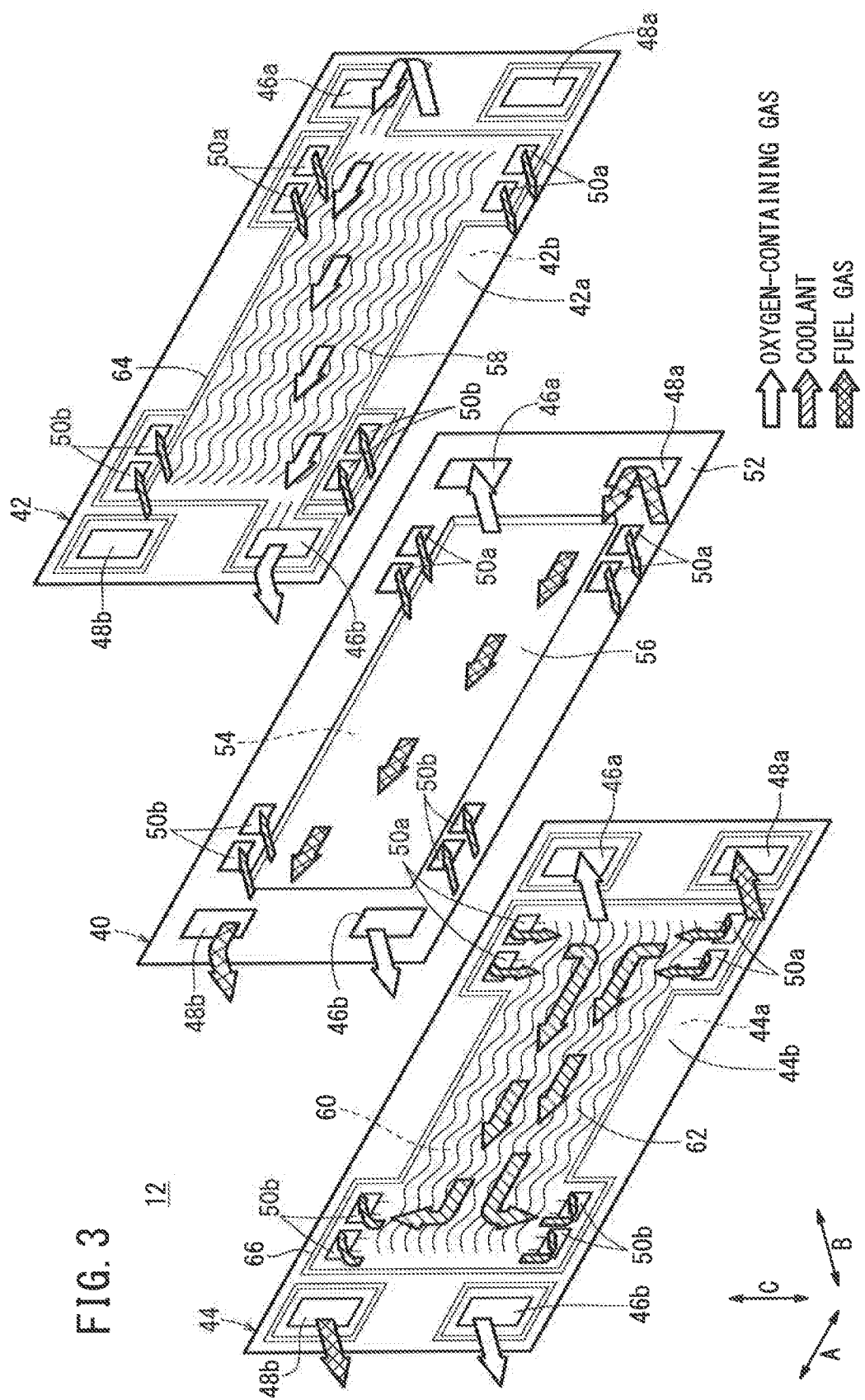
FIG. 3 is an exploded perspective view showing main components of a fuel cell of the fuel cell stack.

As shown in FIG. 3, the fuel cell 12 includes a membrane electrode assembly 40, and a first metal separator (cathode separator) 42 and a second metal separator (anode separator) 44 sandwiching the membrane electrode assembly 40.

The first metal separator 42 and the second metal separator 44 are made of metal plates such as steel plates, stainless steel plates, aluminum plates, plated steel sheets, or metal plates having anti-corrosive surfaces by surface treatment. Each of the first metal separator 42 and the second metal separator 44 has a rectangular planar surface, and is formed by corrugating a thin metal plate by press forming to have ridges and recesses in cross section and a wavy or serpentine shape on the surface. Instead of the first metal separator 42 and the second metal separator 44, for example, carbon separators may be used.

Each of the first metal separator 42 and the second metal separator 44 has a laterally elongated shape. The long sides of the first metal separator 42 and the second metal separator 44 extend in the horizontal direction indicated by the arrow A, and the short sides of the first metal separator 42 and the second metal separator 44 extend in the direction of gravity indicated by the arrow C. Alternatively, the short sides may extend in the horizontal direction and the long sides may extend in the direction of gravity.

At one end of the fuel cell 12 in a long-side direction indicated by the arrow A, an oxygen-containing gas supply passage (fluid passage) 46a and a fuel gas supply passage (fluid passage) 48a are provided. The oxygen-containing gas supply passage 46a and the fuel gas supply passage 48a extend through the fuel cell 12 in the direction indicated by the arrow B. The oxygen-containing gas is supplied through the oxygen-containing gas supply passage 46a. A fuel gas such as a hydrogen-containing gas is supplied through the fuel gas supply passage 48a.

At the other end of the fuel cell 12 in the long-side direction, a fuel gas discharge passage (fluid passage) 48b for discharging the fuel gas and an oxygen-containing gas discharge passage (fluid passage) 46b for discharging the oxygen-containing gas are provided. The fuel gas discharge passage 48b and the oxygen-containing gas discharge passage 46b extend through the fuel cell 12 in the direction indicated by the arrow B.

At opposite ends of the fuel cell 12 in the short-side direction indicated by the arrow C, two pairs of coolant supply passages (fluid passages) 50a for supplying a coolant are oppositely arranged on one side (i.e., on one end side in the horizontal direction) i.e., on a side closer to the oxygen-containing gas supply passage 46a and the fuel gas supply passage 48a. The two pairs of coolant supply passages 50a extend through the fuel cell 12 in the direction indicated by the arrow B for supplying the coolant. The two pairs of coolant supply passages 50a are provided respectively on upper and lower opposite sides.

The two coolant supply passages 50a provided at the upper positions of the fuel cell 12 are separated from each other in the horizontal direction as independent passages of the coolant. The two coolant supply passages 50a provided at the lower positions of the fuel cell 12 are separated from each other in the horizontal direction as independent passages of the coolant.

At opposite ends of the fuel cell 12 in the short-side direction, two pairs of coolant discharge passages (fluid passages) 50b for discharging the coolant are oppositely arranged on the other side (i.e., on the other end side in the horizontal direction), i.e., on a side closer to the fuel gas discharge passage 48b and the oxygen-containing gas discharge passage 46b. The two pairs of coolant discharge passages 50b extend through the fuel cell 12 in the direction indicated by the arrow B for discharging the coolant. The coolant discharge passages 50b are provided respectively on upper and lower opposite sides. The two coolant discharge passages 50b provided at the upper positions of the fuel cell 12 are separated from each other in the horizontal direction as independent passages of the coolant, and the two coolant discharge passages 50b provided at the lower positions of the fuel cell 12 are separated from each other in the horizontal direction as independent passages of the coolant.

The membrane electrode assembly 40 includes a cathode 54 and an anode 56, and a solid polymer electrolyte membrane 52 interposed between the cathode 54 and the anode 56. The solid polymer electrolyte membrane 52 is formed by impregnating a thin membrane of perfluorosulfonic acid with water, for example.

Each of the cathode 54 and the anode 56 has a gas diffusion layer (not shown) such as a carbon paper. Porous carbon particles supporting platinum alloy on a surface thereof are deposited uniformly on the surface of the gas diffusion layer, to thereby form an electrode catalyst layer (not shown). The electrode catalyst layer of the cathode 54 and the electrode catalyst layer of the anode 56 are fixed to both surfaces of the solid polymer electrolyte membrane 52, respectively.

The first metal separator 42 has an oxygen-containing gas flow field 58 on its surface 42a facing the membrane electrode assembly 40. The oxygen-containing gas flow field 58 is connected to the oxygen-containing gas supply passage 46a and the oxygen-containing gas discharge passage 46b. The oxygen-containing gas flow field 58 includes a plurality of wavy flow grooves (or straight flow grooves) extending in the direction indicated by the arrow A.

The second metal separator 44 has a fuel gas flow field 60 on its surface 44a facing the membrane electrode assembly 40. The fuel gas flow field 60 is connected to the fuel gas supply passage 48a and the fuel gas discharge passage 48b. The fuel gas flow field 60 includes a plurality of wavy flow grooves (or straight flow grooves) extending in the direction indicated by the arrow A.

A coolant flow field 62 is formed between the adjacent first and second metal separators 42, 44, more specifically, between a surface 42b of the first metal separator 42 and a surface 44b of the second metal separator 44. The coolant flow field 62 is connected to the coolant supply passages 50a and the coolant discharge passages 50b. The coolant flow field 62 extends in the horizontal direction, and in the coolant flow field 62, the coolant flows over the electrode area of the membrane electrode assembly 40.

A first seal member 64 is formed integrally with the surfaces 42a, 42b of the first metal separator 42, around the outer circumferential end of the first metal separator 42. A second seal member 66 is formed integrally with the surfaces 44a, 44b of the second metal separator 44, around the outer circumferential end of the second metal separator 44.

Each of the first seal member 64 and the second seal member 66 is an elastic seal member which is made of seal material, cushion material, packing material, or the like, such as an EPDM (ethylene propylene diene monomer), an NBR (nitrile butadiene rubber), a fluoro rubber, a silicone rubber, a fluorosilicone rubber, a Butyl rubber, a natural rubber, a styrene rubber, a chloroprene rubber, an acrylic rubber, or the like.

As shown in FIG. 2, an oxygen-containing gas supply manifold member 68a, an oxygen-containing gas discharge manifold member 68b, a fuel gas supply manifold member 70a, and a fuel gas discharge manifold member 70b are attached to the first end plate 18a. The oxygen-containing gas supply manifold member 68a, the oxygen-containing gas discharge manifold member 68b, the fuel gas supply manifold member 70a, and the fuel gas discharge manifold member 70b are made of electrically insulating resin.

The oxygen-containing gas supply manifold member (fluid manifold member) 68a and the oxygen-containing gas discharge manifold member (fluid manifold member) 68b are connected to the oxygen-containing gas supply passage 46a and the oxygen-containing gas discharge passage 46b, respectively. The fuel gas supply manifold member (fluid manifold member) 70a and the fuel gas discharge manifold member (fluid manifold member) 70b are connected to the fuel gas supply passage 48a and the fuel gas discharge passage 48b, respectively.

As shown in FIG. 1, a resin coolant supply manifold member (fluid manifold member) 72a formed by injection molding is provided at the second end plate (one of end plates) 18b. The coolant supply manifold member 72a is connected to the upper and lower pairs of coolant supply passages 50a. A resin coolant discharge manifold member (fluid manifold member) 72b formed by injection molding is provided at the second end plate 18b. The coolant discharge manifold member 72b is connected to the upper and lower pairs of coolant discharge passages 50b. Preferably, the coolant supply manifold member 72a and the coolant discharge manifold member 72b have electrically insulating property.

Figure 4:
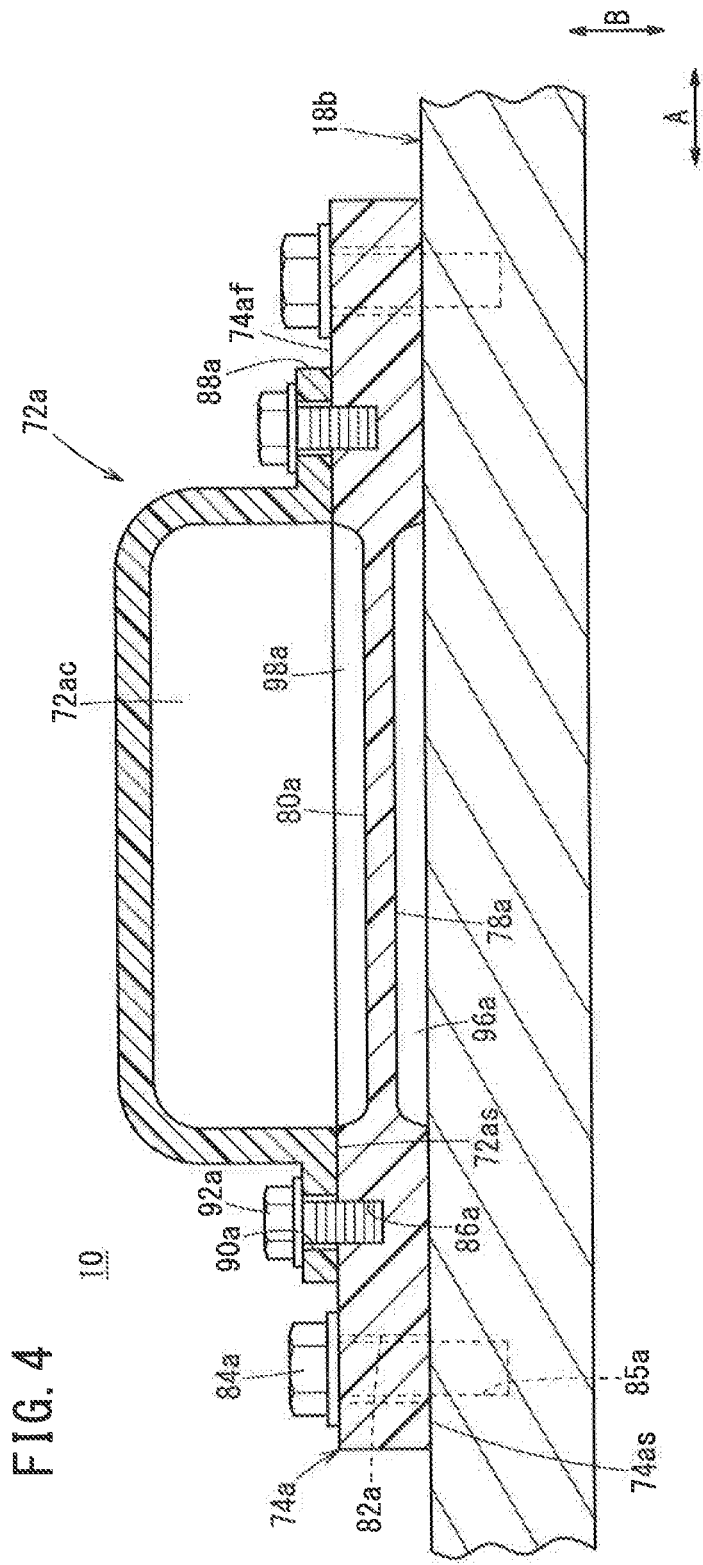
FIG. 4 is a cross sectional view showing the fuel cell stack, taken along a line IV-IV in FIG. 1.
Figure 5:
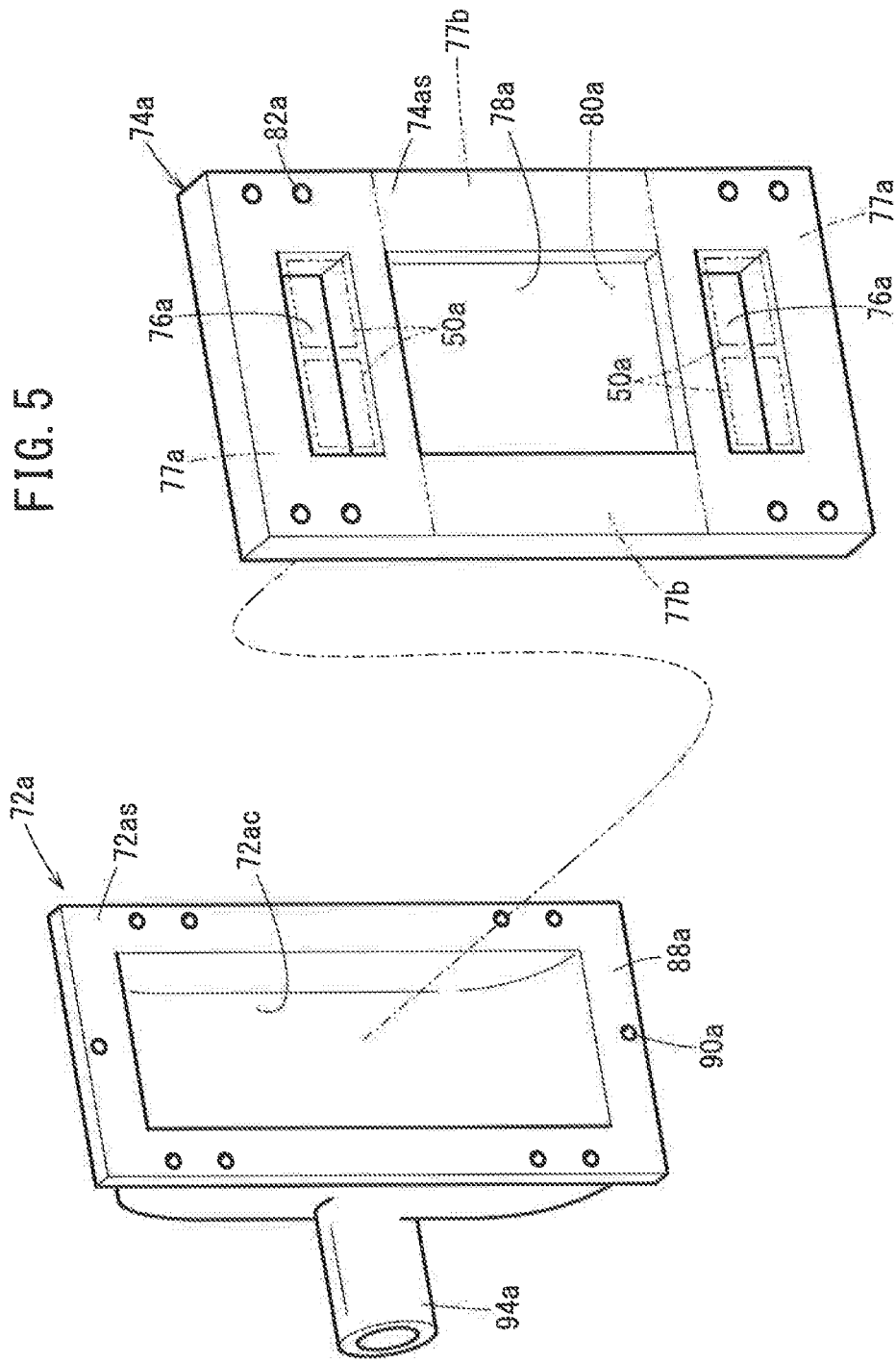
FIG. 5 is an exploded perspective view showing the coolant supply manifold member and an insulating plate of the fuel cell stack, as viewed from one side.
Figure 6:
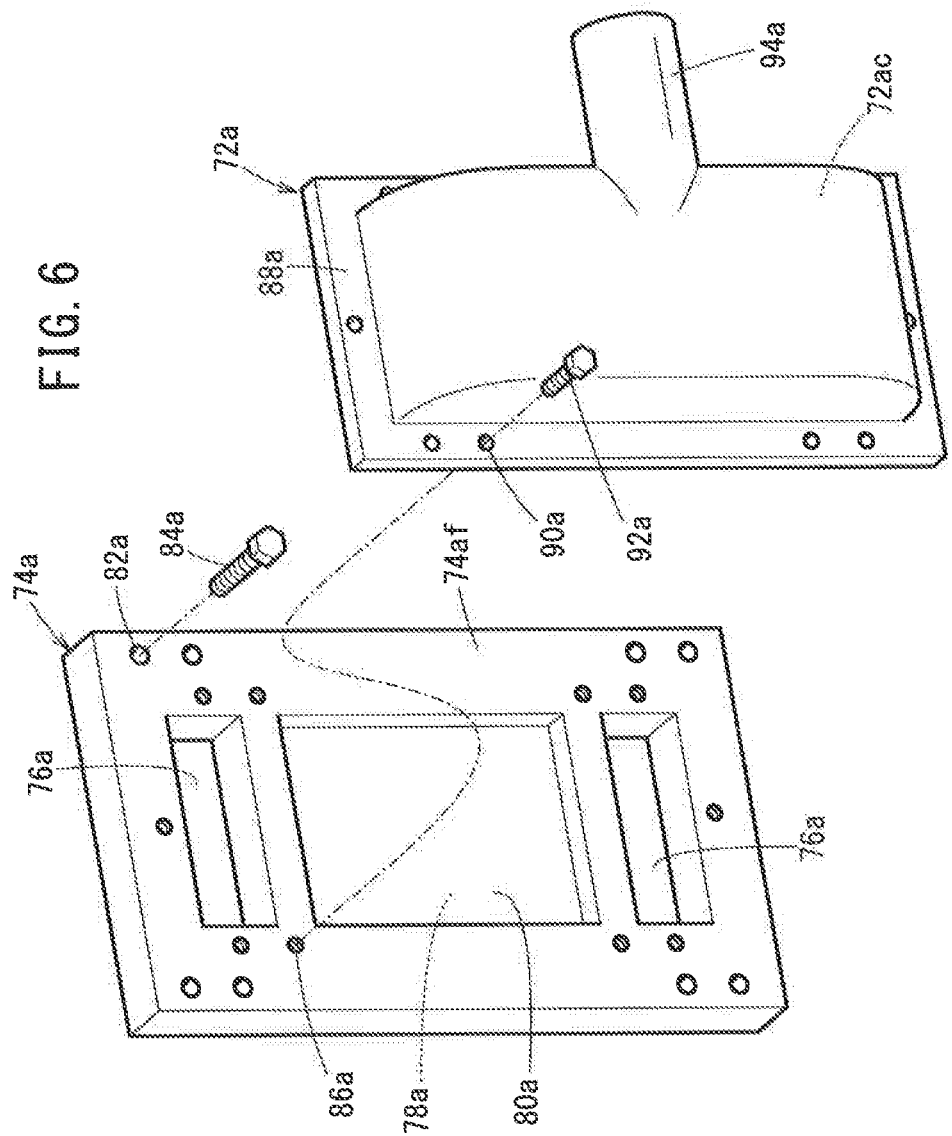
FIG. 6 is an exploded perspective view showing the coolant supply manifold member and the insulating plate, as viewed from the other side.

As shown in FIGS. 4 to 6, the coolant supply manifold member 72a is fixed to the second end plate 18b such that an insulating plate 74a made of electrically insulating resin or the like is interposed between the coolant supply manifold member 72a and the second end plate 18b. The insulating plate 74a is a substantially flat plate, and has a coolant inlet port 76a connected to the two separate coolant supply passages 50a at the upper positions and a coolant inlet port 76a connected to the two separate coolant supply passages 50a at the lower positions.

As shown in FIGS. 4 and 5, the insulating plate 74a has a contact surface 74as which contacts the second end plate 18b. A first recess 78a is formed in the contact surface 74as, excluding portions 77a thereof that surround the upper and lower pairs of coolant supply passages 50a and portions 77b connecting both ends of the surrounding portions 77a (see FIG. 5). The first recess 78a has a substantially rectangular shape, and the first recess 78a is formed at the central portion of the contact surface 74as.

As shown in FIGS. 4 and 6, a second recess 80a is formed on a surface of the insulating plate 74a that contacts the coolant supply manifold member 72a. The second recess 80a is connected to an internal space 72ac of the coolant supply manifold member 72a. The second recess 80a has a substantially rectangular shape, and for example, the size of the opening of the second recess 80a is substantially equal to the size of the opening of the first recess 78a.

A plurality of holes 82a are formed in the outer circumferential edge portion of the insulating plate 74a. As shown in FIG. 4, screws (bolts) 84a inserted into the respective holes 82a are screwed into screw holes 85a of the second end plate 18b to thereby fix the insulating plate 74a to the second end plate 18b. A plurality of screw holes 86a are formed on a surface 74af of the insulating plate 74a facing the coolant supply manifold member 72a, around the second recess 80a and the coolant inlet ports 76a (see FIG. 6).

The coolant supply manifold member 72a has a flange 88a around the internal space 72ac. The flange 88a has a plurality of holes 90a corresponding to the screw holes 86a. Screws 92a inserted through the holes 90a are screwed into the screw holes 86a to thereby fix the coolant supply manifold member 72a to the insulating plate 74a. It should be noted that screw holes may be formed in the second end plate 18b for allowing the screws 92a to be inserted into the screw holes, whereby the coolant supply manifold member 72a and the insulating plate 74a can be tightened together.

An inlet pipe section 94a is provided at an intermediate position of the coolant supply manifold member 72a in the direction indicated by the arrow C (center of the coolant flow field 62 in the flow field width direction). The inlet pipe section 94a is provided along the horizontal direction, or inclined from the horizontal direction.

As shown in FIG. 4, a first gap 96a is formed between a surface of the second end plate 18b and the contact surface 74as of the insulating plate 74a through the first recess 78a. A second gap 98a is formed between the surface 74af of the insulating plate 74a and an attachment surface 72as of the coolant supply manifold member 72a through the second recess 80a. It should be noted that only at least one of the first gap 96a and the second gap 98a may be provided. Further, seal members (not shown) are formed between the coolant supply manifold member 72a and the insulating plate 74a, and between the insulating plate 74a and the second end plate 18b, around the area where coolant flows.

As shown in FIG. 1, the coolant discharge manifold member 72b is fixed to the second end plate 18b through an insulating plate 74b made of electrically insulating resin, etc. The constituent elements of the coolant discharge manifold member 72b that are identical to those of the coolant supply manifold member 72a are labeled with the same reference numerals (with suffix b instead of a), and detailed description thereof is omitted. An outlet pipe section 94b is provided at an intermediate position of the coolant discharge manifold member 72b in the direction indicated by the arrow C as a coolant discharge port. The outlet pipe section 94b is provided along the horizontal direction, or inclined from the horizontal direction.

Operation of the fuel cell stack 10 will be described below.

Firstly, as shown in FIG. 2, an oxygen-containing gas is supplied from the oxygen-containing gas supply manifold member 68a at the first end plate 18a to the oxygen-containing gas supply passage 46a. A fuel gas such as a hydrogen-containing gas is supplied from the fuel gas supply manifold member 70a at the first end plate 18a to the fuel gas supply passage 48a.

Further, as shown in FIG. 1, a coolant such as pure water, ethylene glycol, oil, or the like is supplied from the inlet pipe section 94a to the internal space 72ac of the coolant supply manifold member 72a at the second end plate 18b. The coolant is distributed to the upper pair of coolant supply passages 50a and the lower pair of coolant supply passages 50a connected to the internal space 72ac.

Thus, as shown in FIG. 3, the oxygen-containing gas flows from the oxygen-containing gas supply passage 46a into the oxygen-containing gas flow field 58 of the first metal separator 42. The oxygen-containing gas flows along the oxygen-containing gas flow field 58 in the direction indicated by the arrow A, and the oxygen-containing gas is supplied to the cathode 54 of the membrane electrode assembly 40 for inducing an electrochemical reaction at the cathode 54.

In the meanwhile, the fuel gas is supplied from the fuel gas supply passage 48a to the fuel gas flow field 60 of the second metal separator 44. The fuel gas flows along the fuel gas flow field 60 in the direction indicated by the arrow A, and the fuel gas is supplied to the anode 56 of the membrane electrode assembly 40 for inducing an electrochemical reaction at the anode 56.

Thus, in the membrane electrode assembly 40, the oxygen-containing gas supplied to the cathode 54 and the fuel gas supplied to the anode 56 are consumed in the electrochemical reactions at the electrode catalyst layers of the cathode 54 and the anode 56 for generating electricity.

Then, the oxygen-containing gas consumed at the cathode 54 of the membrane electrode assembly 40 is discharged along the oxygen-containing gas discharge passage 46b in the direction indicated by the arrow B. In the meanwhile, the fuel gas consumed at the anode 56 of the membrane electrode assembly 40 is discharged along the fuel gas discharge passage 48b in the direction indicated by the arrow B.

Further, the coolant supplied to the upper pair of coolant supply passages 50a and the lower pair of coolant supply passages 50a flows into the coolant flow field 62 between the first metal separator 42 and the second metal separator 44. After the coolant temporarily flows inward in the direction indicated by the arrow C such that the coolant from the upper pair of coolant supply passages 50a and the coolant from the lower pair of coolant supply passages 50a move closer to each other, the coolant moves in the direction indicated by the arrow A to cool the membrane electrode assembly 40. Then, the coolant diverges to flow away from each other in the direction indicated by the arrow C, and the coolant is discharged along the upper pair of coolant discharge passages 50b and the lower pair of coolant discharge passages 50b in the direction indicated by the arrow B.

As shown in FIG. 1, the coolant is discharged from the upper pair coolant discharge passages 50b and the lower pair of coolant discharge passages 50b into an internal space 72bc of the coolant discharge manifold member 72b. After the coolant flows toward the center of the internal space 72bc, the coolant is discharged to the outside from the outlet pipe section 94b.

In the first embodiment, as shown in FIG. 1, the insulating plate 74a is provided between the coolant supply manifold member 72a and the second end plate 18b. Further, the insulating plate 74b is provided between the coolant discharge manifold member 72b and the second end plate 18b.

Thus, with the simple and economical structure, a desired electrical insulation between the coolant supply manifold member 72a and the second end plate 18b, and between the coolant discharge manifold member 72b and the second end plate 18b is achieved suitably.

Further, as shown in FIGS. 4 and 5, in the insulating plate 74a stacked on the coolant supply manifold member 72a, the first recess 78a is formed at the contact surface 74as thereof excluding the portions of the contact surface 74as that surround the upper pair of coolant supply passages 50a and the lower pair of coolant supply passages 50a. In the structure, the first gap 96a is formed between the surface of the second end plate 18b and the contact surface 74as of the insulating plate 74a through the first recess 78a, and electrical resistance between the second end plate 18b and the insulating plate 74a is thus increased. The coolant discharge manifold member 72b functions in the same manner as the coolant supply manifold member 72a.

Accordingly, it becomes possible to suitably suppress electrical connection between the fuel cell stack 10 and external equipment (not shown) through the coolant flowing through the coolant supply manifold member 72$a$ and the coolant discharge manifold member 72$b$.

Further, as shown in FIGS. 4 and 6, the second recess 80$a$ is formed in the insulating plate 74$a$, and the second recess 80$a$ is connected to the internal space 72$ac$ of the coolant supply manifold member 72$a$. Moreover, the second gap 98$a$ is provided between the surface 74$af$ of the insulating plate 74$a$ and the attachment surface 72$as$ of the coolant supply manifold member 72$a$ through the second recess 80$a$.

In the structure, electrical resistance of the insulating plate 74$a$ becomes large, the volume of the internal space 72$ac$ is increased, and it is possible to effectively achieve size reduction of the coolant supply manifold member 72$a$. Further, since the shape of the internal space 72$ac$ is simplified, forming is performed easily. Moreover, the same advantages are obtained also on the part of the coolant discharge manifold member 72$b$.

In the first embodiment, though the coolant supply manifold member 72$a$ and the coolant discharge manifold member 72$b$ are used as fluid manifold members, the present invention is not limited in this respect. For example, the present invention may be applicable to the fluid manifold member forming passages of the fuel gas and the oxygen-containing gas.

Figure 7:
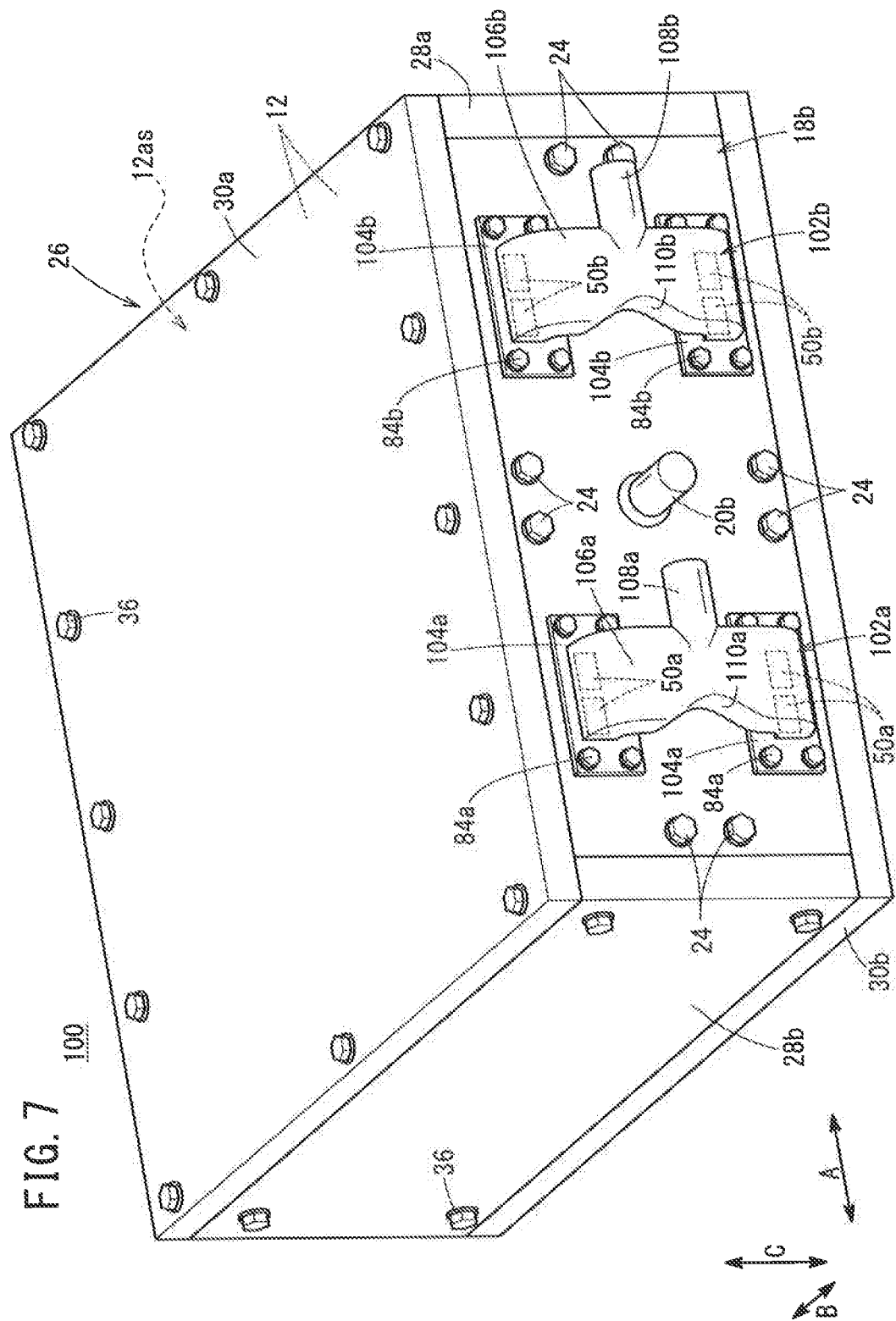
FIG. 7 is a perspective view of a fuel cells stack according to a second embodiment of the present invention, as viewed from a coolant manifold member side.

As shown in FIG. 7, a fuel cell stack 100 according to a second embodiment of the present invention is mounted, e.g., in a fuel cell electrical vehicle (not shown). The constituent elements that are identical to those of the fuel cell stack 10 according to the first embodiment are labeled with the same reference numerals and detailed description thereof will be omitted. Also in the third embodiment described later, the constituent elements that are identical to those of the fuel cell stack 10 according to the first embodiment are labeled with the same reference numerals and detailed description thereof will be omitted.

Figure 8:
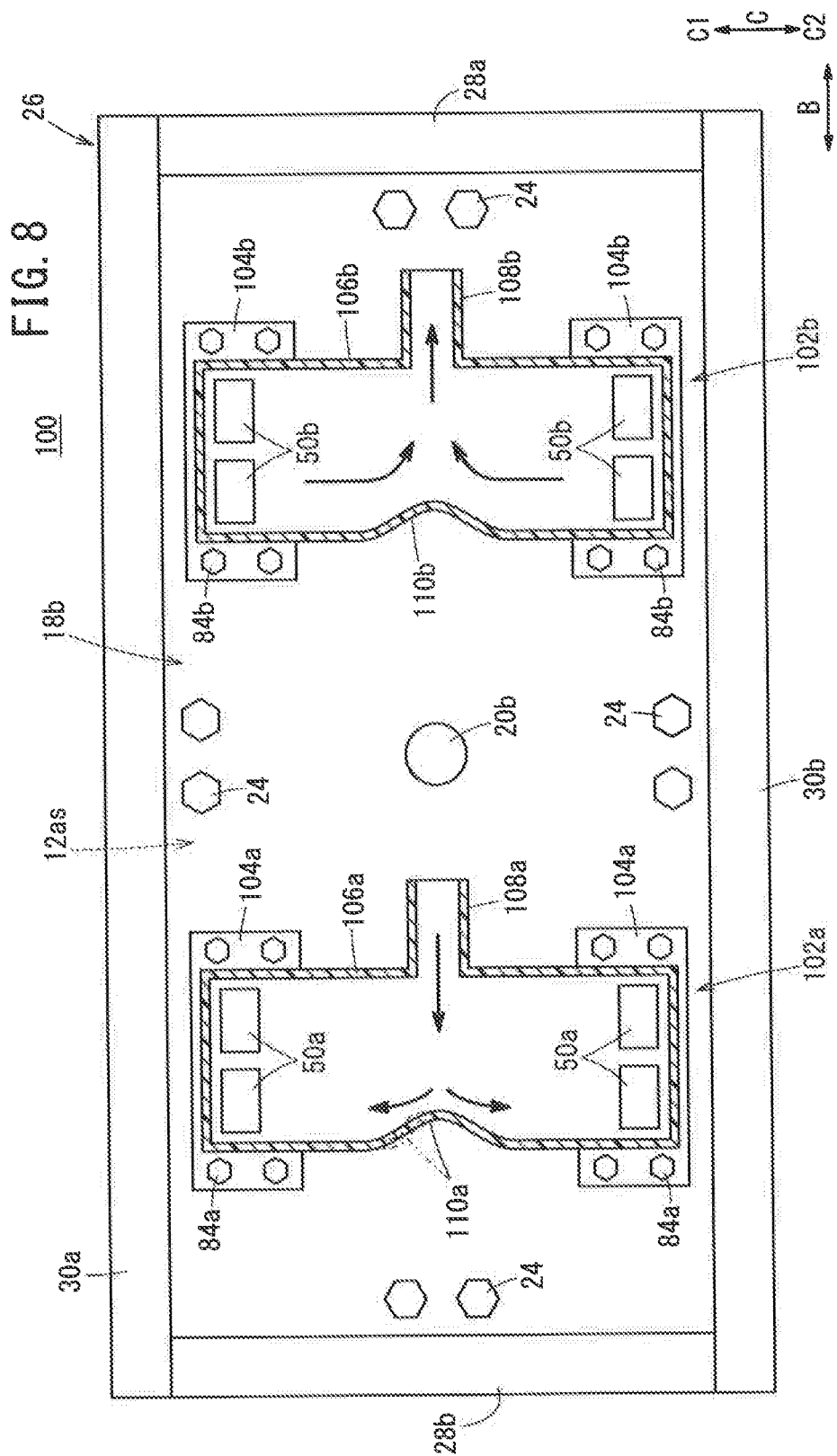
FIG. 8 is a front view of the fuel cell stack, as viewed from the coolant manifold member side.

As shown in FIGS. 7 and 8, a resin coolant supply manifold member (coolant manifold) 102$a$ is attached to the second end plate 18$b$. The coolant supply manifold member 102$a$ is connected to two pairs of coolant supply passages 50$a$ (one pair of two coolant supply passages 50$a$ at upper positions and the other pair of two coolant supply passages 50$a$ at lower positions) arranged respectively on the opposite long sides of the second end plate 18$b$. A resin coolant discharge manifold member (coolant manifold) 102$b$ is attached to the second end plate 18$b$. The coolant discharge manifold member 102$b$ is connected to two pairs of coolant discharge passages 50$b$ (one pair of two coolant discharge passages 50$b$ at upper positions and the other pair of two coolant discharge passages 50$b$ at lower positions) arranged respectively on the opposite long sides of the second end plate 18$b$.

The coolant supply manifold member 102$a$ includes upper and lower flanges 104$a$ connected respectively to the upper and lower pairs of coolant supply passages 50$a$. The flanges 104$a$ are formed integrally with a substantially rectangular cylindrical supply body section 106$a$. An inlet pipe section 108$a$ as a coolant supply port is provided at an intermediary position of the supply body section 106$a$ (at the central portion of the coolant flow field 62 in the flow field width direction).

A protrusion 110$a$ bulging toward the inlet pipe section 108$a$ is provided on a manifold inner surface of the supply body section 106$a$ facing the inlet pipe section 108$a$, at substantially the center between the upper and lower coolant supply passages 50$a$. The protrusion 110$a$ is formed by recessing an outer wall surface of the supply body section 106$a$ toward the inlet pipe section 108$a$ to have a smooth curved surface, e.g., circular arc surface bulging into the interior of the manifold. The protrusion 110$a$ has a vertically symmetrical shape. It should be noted that the protrusion 110$a$ may have a vertically asymmetrical shape. In this case, as shown by a two dot chain line in FIG. 8, preferably, the slope on the upper side is steep, and the slope on the lower side is gentle in comparison with the upper side. Each of the flanges 104$a$ is fixed to the second end plate 18$b$ using a plurality of bolts 84$a$.

The coolant discharge manifold member 102$b$ includes upper and lower flanges 104$b$ connected respectively to upper and lower pairs of coolant discharge passages 50$b$. The flanges 104$b$ are formed integrally with a substantially rectangular cylindrical discharge body section 106$b$. An outlet pipe section 108$b$ as a coolant discharge port is provided at an intermediary position of the discharge body section 106$b$.

A protrusion 110$b$ bulging toward the outlet pipe section 108$b$ is provided on a manifold inner surface of the discharge body section 106$b$ facing the outlet pipe section 108$b$, at substantially the center of the upper and lower coolant discharge passages 50$b$. The protrusion 110$b$ is formed by recessing an outer wall surface of the discharge body section 106$b$ toward the outlet pipe section 108$b$ to have a smooth curved surface, e.g., circular arc surface bulging into the interior of the manifold. It is noted that the protrusion 110$b$ is provided on the discharge body section 106$b$ as necessary, and the protrusion 110$b$ may not be provided. Each of the flanges 104$b$ is fixed to the second end plate 18$b$ using a plurality of bolts 84$b$.

In the second embodiment, the coolant supply manifold member 102$a$ and the coolant discharge manifold member 102$b$ are provided on the second end plate 18$b$. In the coolant supply manifold member 102$a$, the protrusion 110$a$ bulging toward the inlet pipe section 108$a$ is provided on the manifold inner surface of the supply body section 106$a$ facing the inlet pipe section 108$a$.

In the structure, as shown in FIG. 8, the coolant supplied from the inlet pipe section 108$a$ into the supply body section 106$a$ (into the manifold) flows toward the protrusion 110$a$ facing the inlet pipe section 108$a$. Therefore, since the coolant is blown onto the protrusion 110$a$, by the guiding action of the protrusion 110$a$, the coolant bifurcates so as to flow toward the upper side in the vertical direction (direction indicated by an arrow C1) and toward the lower side in the vertical direction (direction indicated by an arrow C2).

Thus, since the coolant is suitably distributed and supplied in the direction indicated by the arrow C1 and in the direction indicated by the arrow C2, bad distribution (instability of distribution) of the coolant is suppressed reliably. Accordingly, the coolant is reliably supplied to the upper two coolant supply passages 50$a$ and the lower two coolant supply passages 50$a$.

In the second embodiment, with the simple and economical structure, the coolant supplied into the coolant supply manifold member 102$a$ flows toward the upper and lower pairs of coolant supply passages 50$a$ smoothly and uniformly. Accordingly, improvement in the cooling performance of each fuel cell 12 is achieved suitably.

In the coolant discharge manifold member 102$b$, the protrusion 110$b$ bulging toward the outlet pipe section 108$b$ is provided on the manifold inner surface of the discharge body section 106$b$ facing the outlet pipe section 108$b$.

In the structure, the coolant introduced from the upper two coolant discharge passages 50b and the lower two coolant discharge passages 50b into the discharge body section 106b flows toward the protrusion 110b facing the outlet pipe section 108b. Thus, by the guiding action of the protrusion 110b, the coolant flows from the vertically downward direction to the horizontal direction, or from the vertically upward direction to the horizontal direction. Accordingly, the coolant is suitably discharged from the outlet pipe section 108b facing the protrusion 110b.

Therefore, with the simple economical structure, the coolant flows smoothly and uniformly from the upper and lower pairs of the coolant discharge passages 50b into the coolant discharge manifold member 102b, and the coolant is discharged into the outlet pipe section 108b. Accordingly, the cooling performance of each fuel cell 12 is improved suitably.

Figure 9:
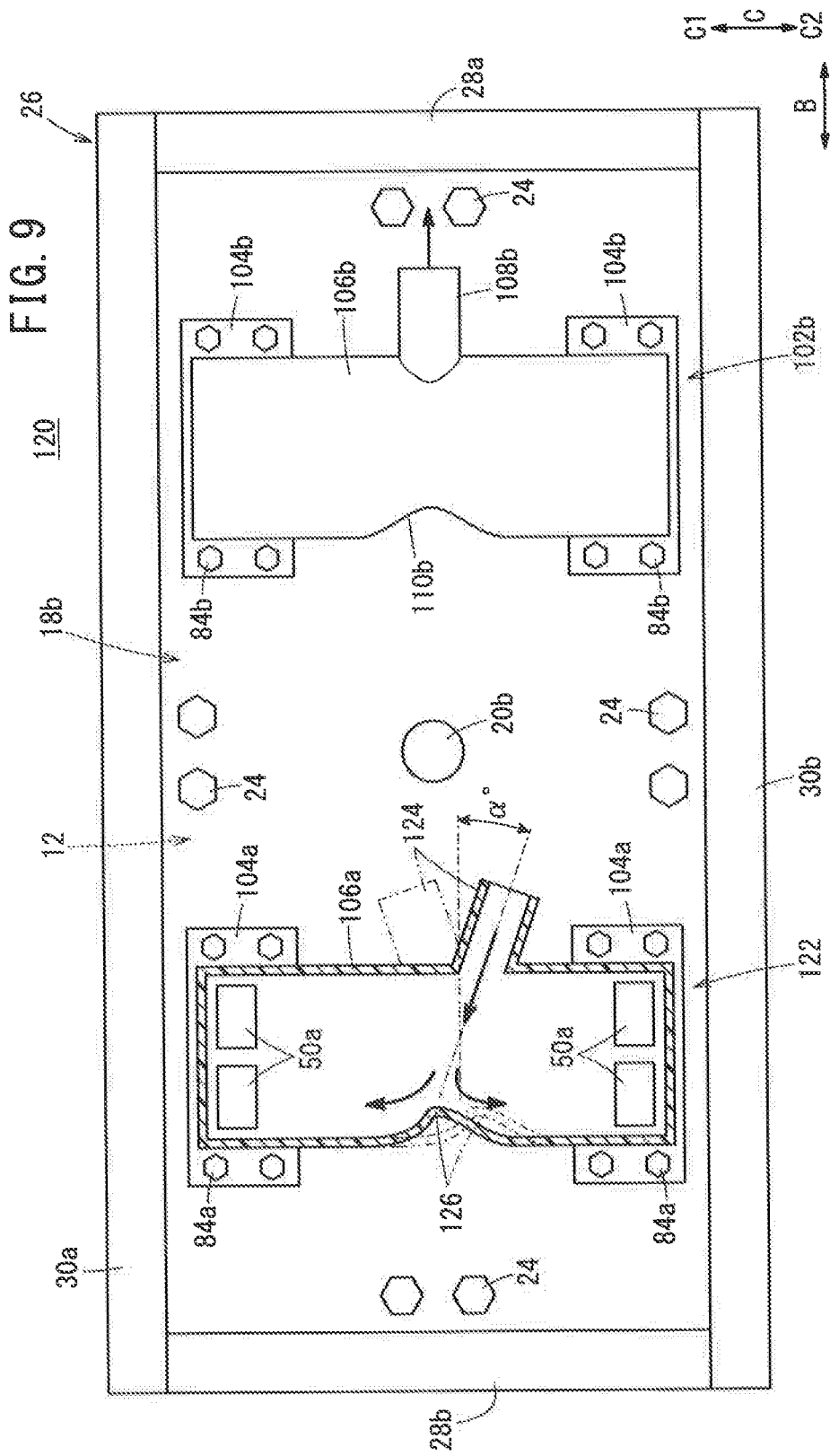
FIG. 9 is a front view showing of a fuel cell stack according to a third embodiment of the present invention, as viewed from a coolant manifold member side.

FIG. 9 is a front view showing a fuel cell stack 120 according to a third embodiment of the present invention.

In the fuel cell stack 120, a resin coolant supply manifold member (coolant manifold) 122 and a resin coolant discharge manifold member 102b are attached to the second end plate 18b. An inlet pipe section 124 as a coolant supply port is provided on the coolant supply manifold member 122 at a position closer to the lower coolant supply passages 50a of the supply body section 106a.

The inlet pipe section 124 is inclined downwardly at an angle α° relative to the flow direction of the coolant in the coolant flow field 62 indicated by an arrow B. A protrusion 126 bulging toward the inlet pipe section 124 is provided on the manifold inner surface of the supply body section 106a facing the inlet pipe section 124. The center of the protrusion 126 is situated at a position closer to the upper coolant supply passages 50a. The protrusion 126 is formed by recessing an outer wall surface of the supply body section 106a toward the inlet pipe section 124 (i.e., forming a slope on the outer wall surface of the supply body section 106a) to have a smooth curved surface, e.g., circular arc surface bulging into the manifold. In the protrusion 126, the slope on the upper side is steep in comparison with the lower side.

It should be noted that, in the case where the inlet pipe section 124 is provided at a position closer to the upper coolant supply passages 50a in the coolant supply manifold member 122, the angle of the inlet pipe section 124 and the angle of the protrusion 126 are set in a manner opposite to the angle described above (see two dot chain line in FIG. 9).

In the third embodiment, the coolant supplied obliquely upward from the inlet pipe section 124 to the inside of the supply body section 106a (into the manifold) at the angle α° flows toward the protrusion 126 facing the inlet pipe section 124. Accordingly, the coolant is blown onto the protrusion 126, and thus, by the guiding action of the protrusion 126, the coolant is distributed so as to flow in the vertically upward direction indicated by the arrow C1 and in the vertically downward direction indicated by the arrow C2.

Thus, since the coolant is suitably distributed and supplied in the direction indicated by the arrow C1 and in the direction indicated by the arrow C2, bad distribution (instability of distribution) of the coolant is suppressed reliably. In the structure, the coolant is reliably supplied to the upper two coolant supply passages 50a and the lower two coolant supply passages 50a. Accordingly, the same advantages as in the case of the second embodiment are obtained. It should be noted that the coolant discharge manifold member 102b may have the same structure as the above described coolant supply manifold member 122.

Figure 10:
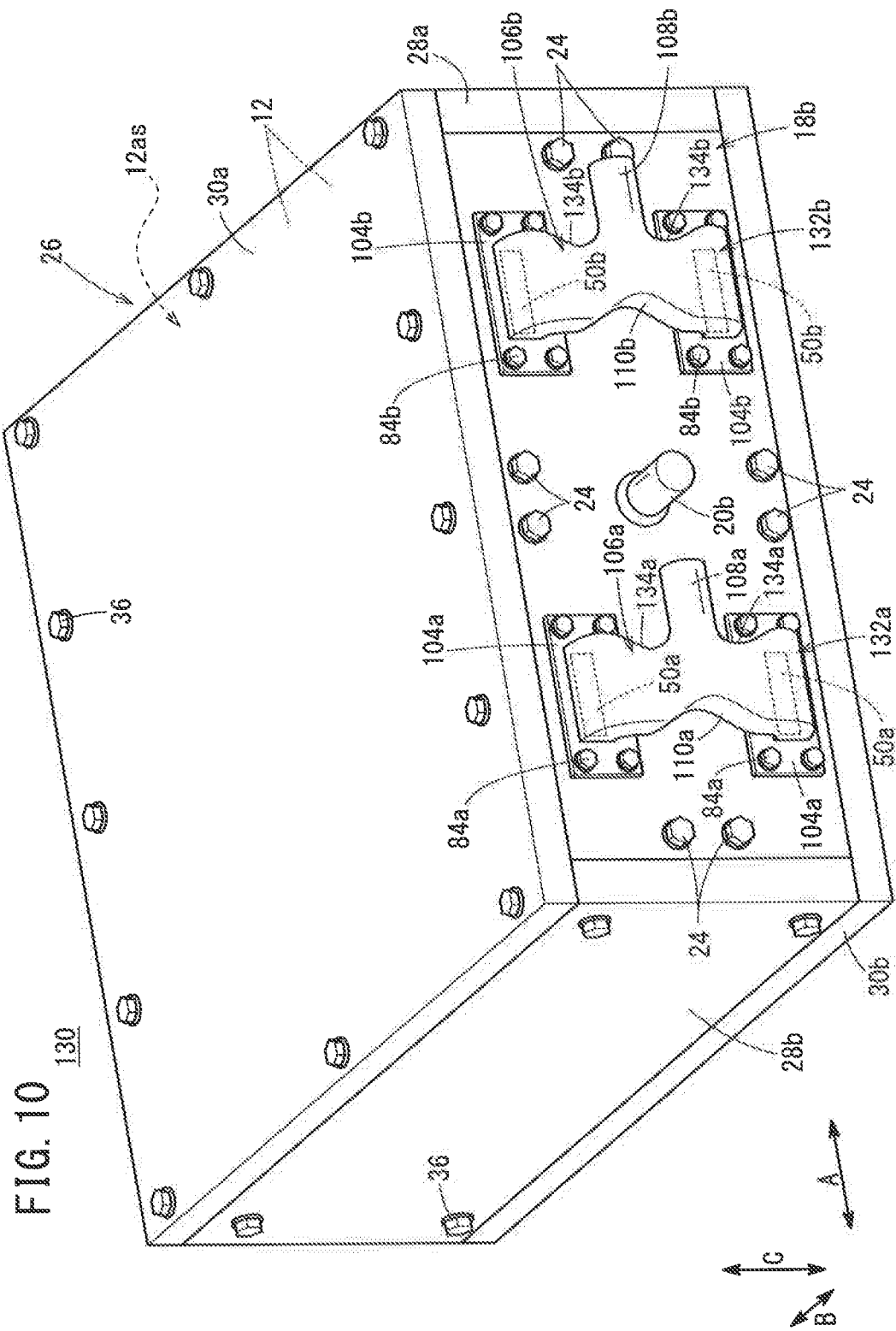
FIG. 10 is a perspective view of a fuel cell stack according to a fourth embodiment of the present invention, as viewed from a coolant manifold member side.

As shown in FIG. 10, a fuel cell stack 130 according to a fourth embodiment of the present invention is mounted, e.g., in a fuel cell electrical vehicle (not shown). The constituent elements that are identical to those of the fuel cell stack 100 according to the second embodiment are labeled with the same reference numerals and detailed description thereof will be omitted. Also in the fifth embodiment described later, the constituent elements that are identical to those of the fuel cell stack 100 according to the second embodiment are labeled with the same reference numerals and detailed description thereof will be omitted.

Figure 11:
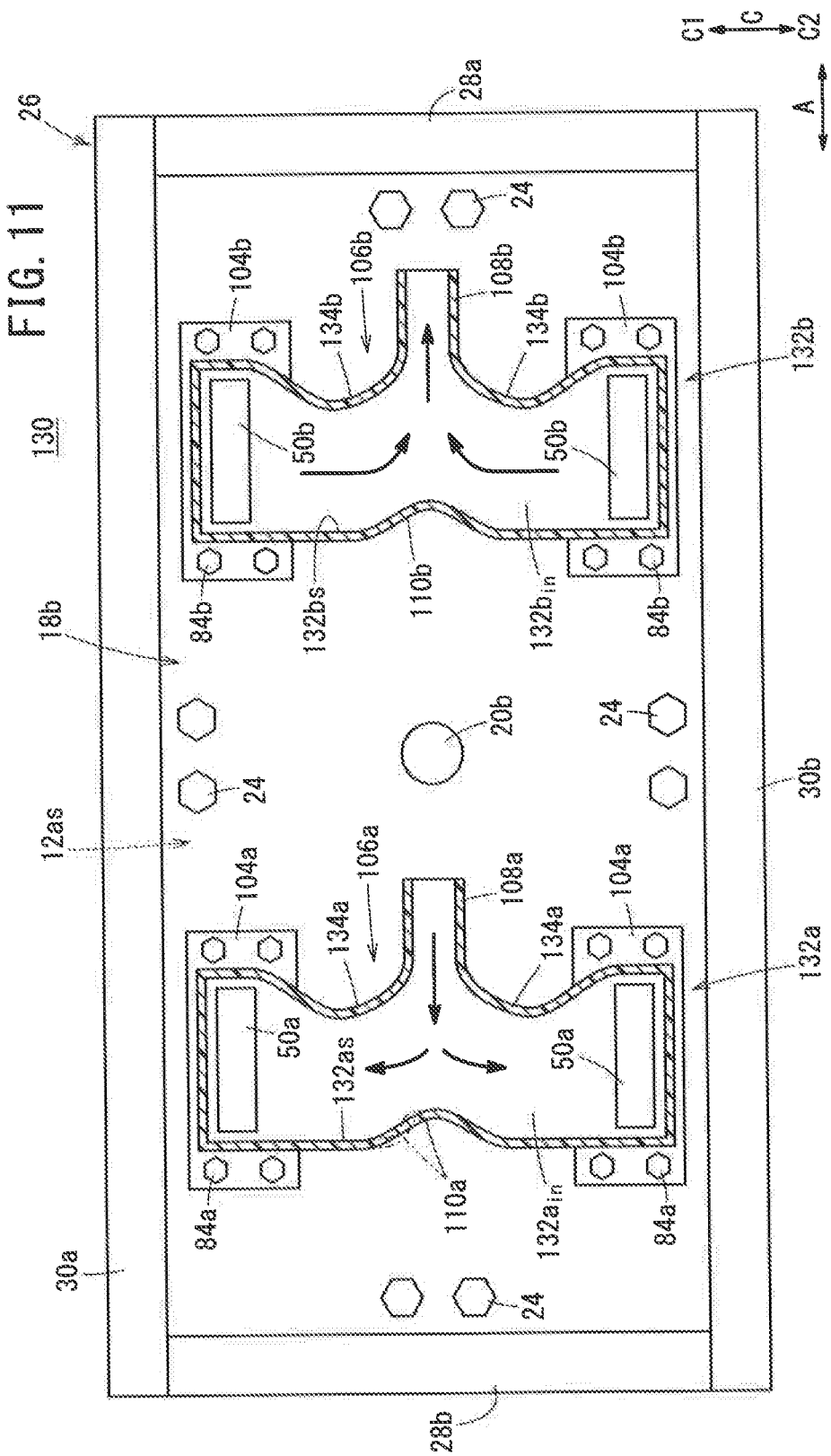
FIG. 11 is a front view of the fuel cell stack, as viewed from the coolant manifold member side.

As shown in FIGS. 10 and 11, a resin coolant supply manifold member (coolant manifold) 132a is attached to the second end plate 18b. The coolant supply manifold member 132a is connected to a pair of upper and lower coolant supply passages 50a arranged respectively on the opposite long sides of the second end plate 18b. A resin coolant discharge manifold member (coolant manifold) 132b is attached to the second end plate 18b. The coolant discharge manifold member 132b is connected to a pair of upper and lower coolant discharge passages 50b arranged respectively on the opposite long sides of the second end plate 18b. Alternatively, as with in the first and second embodiments, two coolant supply passages 50a may be arranged on each of the opposite long sides, and two coolant discharge passages 50b may be arranged on each of the opposite long sides. Further, in the first and second embodiment, one coolant supply passage 50a may be arranged on each of the opposite long sides, and one coolant discharge passage 50b may be arranged on each of the opposite long sides.

The coolant supply manifold member 132a includes a supply body section 106a. A protrusion 110a bulging toward an inlet pipe section 108a is provided on a manifold inner surface 132as of the supply body section 106a facing the inlet pipe section 108a, at substantially the center between the upper and lower coolant supply passages 50a. Protrusions 134a bulging toward an inside $132a_{in}$ of the manifold are provided respectively on both sides of the inlet pipe section 108a of the supply body section 106a. Each of the protrusions 134a is formed on the manifold inner surface 132as to have a smooth curved surface, e.g., circular arc surface.

The coolant discharge manifold member 132b includes a discharge body section 106b. A protrusion 110b bulging toward an outlet pipe section 108b is provided on a manifold inner surface 132bs of the discharge body section 106b facing the outlet pipe section 108b, at substantially the center between the upper and lower coolant discharge passages 50b. Protrusions 134b bulging toward an inside $132b_{in}$ of the manifold are provided respectively on both sides of the outlet pipe section 108b of the discharge body section 106b. Each of the protrusions 134b is formed on the manifold inner surface 132bs to have a smooth curved surface, e.g., circular arc surface.

In this case, as shown in FIGS. 10 and 11, in the fourth embodiment, the coolant supply manifold member 132a and the coolant discharge manifold member 132b are provided on the second end plate 18b. In the coolant supply manifold member 132a, the protrusions 134a bulging toward the manifold inside $132a_{in}$ are provided respectively on both sides (upper and lower sides) of the inlet pipe section 108a of the supply body section 106a.

Thus, as shown in FIG. 11, coolant supplied from the inlet pipe section 108a into the supply body section 106a (manifold inside $132a_{in}$) flows along the shape of the protrusions 134a arranged respectively on both sides (upper and lower sides) of the inlet pipe section 108a. Accordingly, by the guiding action of the protrusions 134a, the coolant is distributed so as to flow in the vertically upward direction (indicated by an arrow C1) and in the vertically downward direction (indicated by an arrow C2).

Owing thereto, the coolant is suitably and smoothly distributed and supplied in the direction indicated by the arrow C1 and in the direction indicated by the arrow C2, and bad distribution (instability of distribution) of the coolant is thus suppressed reliably. Accordingly, the coolant is reliably supplied to the upper coolant supply passage 50a and the lower coolant supply passage 50a.

In the fourth embodiment, with the simple and economical structure, the coolant supplied into the coolant supply manifold member 132a flows toward the pair of upper and lower coolant supply passages 50a smoothly and uniformly. Accordingly, improvement in the cooling performance of each fuel cell 12 is achieved suitably.

Meanwhile, in the coolant discharge manifold member 132b, the protrusions 134b bulging toward the manifold inside $132b_{in}$ are provided respectively on both sides (upper and lower sides) of the outlet pipe section 108b of the discharge body section 106b.

In the structure, as shown in FIG. 11, the coolant introduced from the upper coolant discharge passage 50b and the lower coolant discharge passage 50b into the discharge body section 106b flows along the shape of the protrusions 134b. Thus, by the guiding action of the protrusions 134b, the coolant flows from the vertically downward direction to the horizontal direction, or from the vertically upward direction to the horizontal direction. Accordingly, the coolant is suitably discharged from the outlet pipe section 108b facing the protrusion 110b.

Therefore, with the simple economical structure, the coolant flows smoothly and uniformly from the pair of upper and lower coolant discharge passages 50b into the coolant discharge manifold member 132b, and the coolant is discharged into the outlet pipe section 108b. Accordingly, the cooling performance of each fuel cell 12 is improved suitably.

Figure 12:
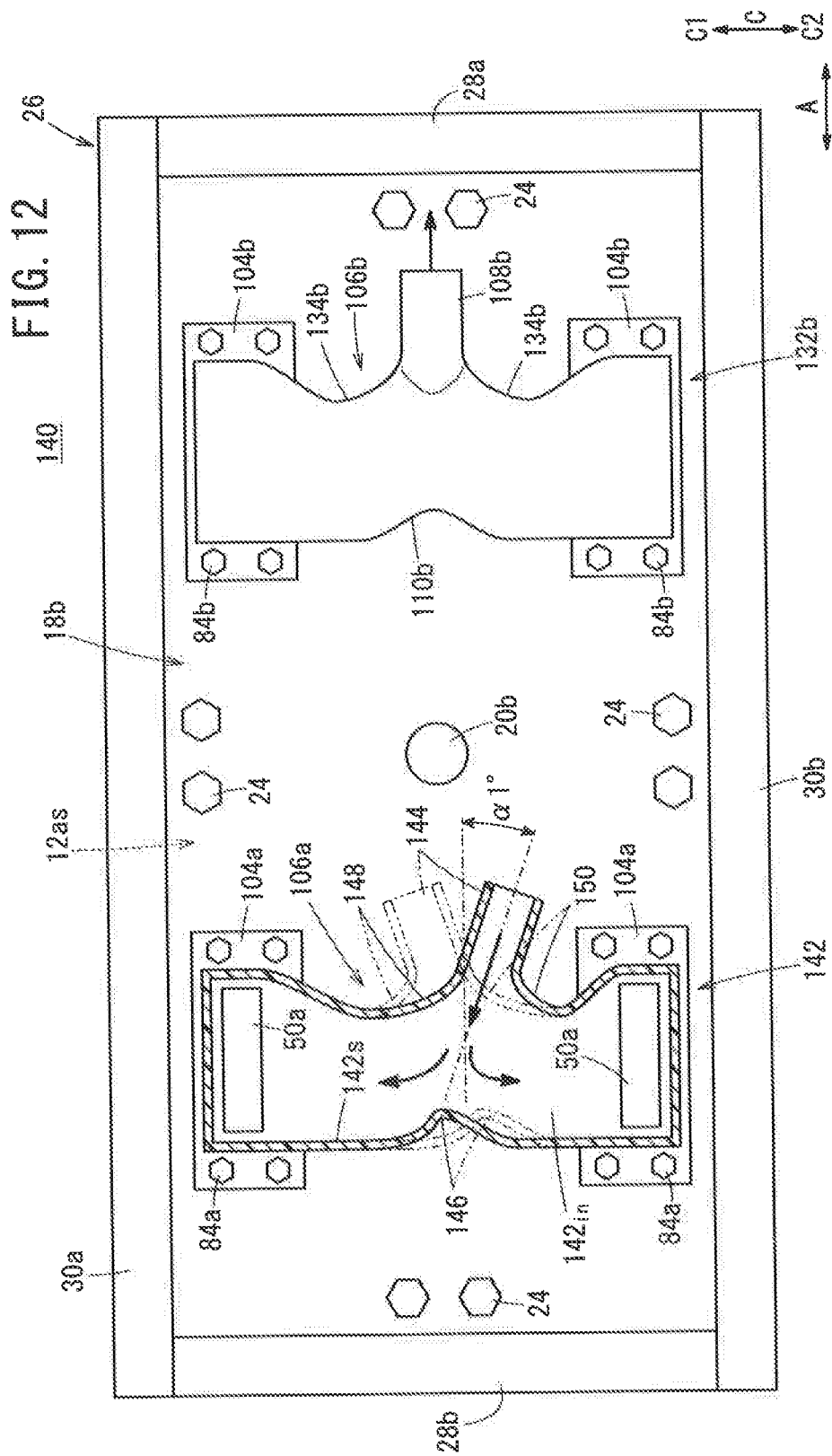
FIG. 12 is a front view of a fuel cell stack according to a fifth embodiment of the present invention, as viewed from a coolant manifold member side.

FIG. 12 is a front view showing a fuel cell stack 140 according to a fifth embodiment of the present invention, as viewed from a coolant manifold member side. The constituent elements that are identical to those of the fuel cell stack 130 according to the fourth embodiment are labeled with the same reference numerals and detailed description thereof will be omitted.

In the fuel cell stack 140, a resin coolant supply manifold member (coolant manifold) 142 and a resin coolant discharge manifold member 132b are attached to the second end plate 18b. An inlet pipe section 144 as a coolant supply port is provided on the coolant supply manifold member 142 at a position closer to the lower coolant supply passage 50a of the supply body section 106a.

The inlet pipe section 144 is inclined downwardly at an angle α1° relative to the flow direction of the coolant in the coolant flow field 62 indicated by an arrow A. A protrusion 146 bulging toward the inlet pipe section 144 is provided on a manifold inner surface 142s of the supply body section 106a facing the inlet pipe section 144. The center of the protrusion 146 is situated at a position closer to the upper coolant supply passage 50a. The protrusion 146 is formed by recessing an outer wall surface of the supply body section 106a toward the inlet pipe section 144 (i.e., forming a slope on the outer wall surface of the supply body section 106a) to have a smooth curved surface, e.g., circular arc surface bulging toward a manifold inside $142_{in}$. In the protrusion 146, the slope on the upper side is steep in comparison with the lower side.

Protrusions 148, 150 bulging toward the manifold inside $142_{in}$ are provided respectively on both sides of the inlet pipe section 144 of the supply body section 106a. Each of the protrusions 148, 150 is formed on the manifold inner surface 142s to have a smooth curved surface, e.g., circular arc surface.

It should be noted that, in the case where the inlet pipe section 144 is provided at a position closer to the upper coolant supply passage 50a in the coolant supply manifold member 142, the angle of the inlet pipe section 144, the angle of the protrusion 146, and the angles of the protrusions 148, 150 are set in a manner opposite to the angles described above (see two dot chain line in FIG. 12).

In the fifth embodiment, the coolant supplied obliquely upward from the inlet pipe section 144 to the inside of the supply body section 106a (to the manifold inside $142_{in}$) at the angle α1° flows along the shape of the protrusions 148, 150. Accordingly, by the guiding action of the protrusions 148, 150, the coolant is distributed so as to flow in the vertically upward direction indicated by the arrow C1 and in the vertically downward direction indicated by the arrow C2.

Thus, since the coolant is suitably distributed and supplied in the direction indicated by the arrow C1 and in the direction indicated by the arrow C2, bad distribution (instability of distribution) of the coolant is suppressed reliably. In the structure, the coolant is reliably supplied to the upper coolant supply passage 50a and the lower coolant supply passage 50a. Accordingly, the same advantages as in the case of the fourth embodiment are obtained. It should be noted that the coolant discharge manifold member 132b may have the same structure as the above described coolant supply manifold member 142.

While the invention has been particularly shown and described with a reference to preferred embodiments, it will be understood that variations and modifications can be effected thereto by those skilled in the art without departing from the scope of the invention as defined by the appended claims.

What is claimed is:

1. A fuel cell stack including a stack body formed by stacking a plurality of fuel cells together in a stacking direction for generating electrical energy by electrochemical reactions of a fuel gas and an oxygen-containing gas, a fluid passage extending through the stack body in the stacking direction for allowing a fluid, which is a coolant, the fuel gas, or the oxygen-containing gas, to flow through the fuel cells, the fuel cell stack further including end plates provided at both ends of the stack body in the stacking direction, at least one of the end plates having a fluid manifold member connected to the fluid passage, wherein an insulating plate having a substantially flat plate shape is provided between the one of the end plates and an attachment surface of the fluid manifold member, the insulating plate includes a frame part in contact with one of the end plates and the fluid manifold member, and a central part surrounded by the frame part, the central part of the insulating plate includes a first surface facing the one of the end plates and a second surface facing the fluid manifold member, at least one of the first surface and the second surface is provided with a recessed part, a thickness of the insulating plate in the recessed part is thinner than a thickness of the insulating plate in the frame part, the recessed part creates a gap.

2. The fuel cell stack according to claim 1, wherein an insulating plate is provided between the one of the end plates and an attachment surface of the fluid manifold member, the insulating plate having a contact surface which contacts the one of the end plates; and the gap is formed at the contact surface excluding a portion thereof that surrounds the fluid passage.

\* \* \* \* \*